(12) United States Patent
Johnson

(10) Patent No.: US 8,890,902 B2
(45) Date of Patent: Nov. 18, 2014

(54) BACKLIGHT SIMULATION AT REDUCED RESOLUTIONS TO DETERMINE SPATIAL MODULATION OF LIGHT FOR HIGH DYNAMIC RANGE IMAGES

(75) Inventor: Lewis Johnson, Delta (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 679 days.

(21) Appl. No.: 13/123,569

(22) PCT Filed: Oct. 2, 2009

(86) PCT No.: PCT/US2009/059343
§ 371 (c)(1),
(2), (4) Date: Apr. 11, 2011

(87) PCT Pub. No.: WO2010/045039
PCT Pub. Date: Nov. 22, 2010

(65) Prior Publication Data
US 2011/0193896 A1    Aug. 11, 2011

Related U.S. Application Data

(60) Provisional application No. 61/105,419, filed on Oct. 14, 2008.

(51) Int. Cl.
G09G 5/10    (2006.01)
G09G 3/34    (2006.01)
G06T 5/00    (2006.01)
H04N 5/14    (2006.01)

(52) U.S. Cl.
CPC ....... *G06T 5/009* (2013.01); *G06T 2207/10016* (2013.01); *G09G 3/3426* (2013.01); *G09G 2320/0646* (2013.01); *H04N 5/142* (2013.01); *G06T 2207/20012* (2013.01); *G09G 2340/0407* (2013.01)
USPC .......................................... 345/690

(58) Field of Classification Search
CPC ... G09G 5/10; G09G 3/34; G09G 2320/0646; G09G 2360/16
USPC .................................. 345/690, 102
See application file for complete search history.

(56) References Cited

U.S. PATENT DOCUMENTS 7,551,341 B1    6/2009  Ward
2003/0090455 A1*  5/2003  Daly ............................. 345/102

(Continued)

FOREIGN PATENT DOCUMENTS

CN  ZL200610108037.1    3/2007
CN  ZL200580029193.2    8/2007

(Continued)

OTHER PUBLICATIONS

Douglas Jones, "Reciprocal Multiplication, a tutorial" University of Iowa Department of Computer Science, Jan. 15, 2000.

(Continued)

*Primary Examiner* — Claire X Pappas
*Assistant Examiner* — Robert Stone

(57) ABSTRACT

Embodiments of the invention relate generally to generating images with an enhanced range of brightness levels, and more particularly, to facilitating high dynamic range imaging by adjusting pixel data and/or using predicted values of luminance, for example, at different resolutions. In at least one embodiment, a method generates an image with an enhanced range of brightness levels. The method can include accessing a model of backlight that includes data representing values of luminance for a number of first samples. The method also can include inverting the values of luminance, as well as upsampling inverted values of luminance to determine upsampled values of luminance. Further, the method can include scaling pixel data for a number of second samples by the upsampled values of luminance to control a modulator to generate an image.

9 Claims, 6 Drawing Sheets

(56) References Cited

U.S. PATENT DOCUMENTS

| | | | |
|---|---|---|---|
| 2005/0110740 A1* | 5/2005 | Linzmeier et al. | 345/102 |
| 2005/0248553 A1 | 11/2005 | Feng | |
| 2005/0248554 A1* | 11/2005 | Feng et al. | 345/204 |
| 2006/0103621 A1 | 5/2006 | Feng | |
| 2006/0202945 A1 | 9/2006 | Feng | |
| 2007/0279372 A1* | 12/2007 | Brown Elliott et al. | 345/102 |
| 2007/0285382 A1 | 12/2007 | Feng | |
| 2008/0129677 A1* | 6/2008 | Li et al. | 345/102 |
| 2008/0180465 A1* | 7/2008 | Whitehead et al. | 345/694 |
| 2008/0180466 A1 | 7/2008 | Whitehead | |
| 2009/0034868 A1* | 2/2009 | Rempel et al. | 382/264 |
| 2009/0034871 A1* | 2/2009 | Keshet et al. | 382/274 |
| 2009/0109233 A1* | 4/2009 | Kerofsky et al. | 345/589 |
| 2009/0174638 A1* | 7/2009 | Brown Elliott et al. | 345/88 |
| 2009/0278867 A1* | 11/2009 | Brown Elliott et al. | 345/690 |
| 2009/0295706 A1* | 12/2009 | Feng | 345/102 |
| 2009/0322800 A1* | 12/2009 | Atkins | 345/690 |
| 2010/0020003 A1* | 1/2010 | Feng | 345/102 |
| 2011/0148900 A1* | 6/2011 | Feng et al. | 345/589 |

FOREIGN PATENT DOCUMENTS

| | | |
|---|---|---|
| JP | 2005-309388 | 11/2005 |
| JP | 2006-330400 | 12/2006 |
| JP | 5419352 | 3/2008 |
| JP | 2008-216560 | 9/2008 |
| WO | 2010/045038 | 4/2010 |
| WO | 2012/125756 | 9/2012 |

OTHER PUBLICATIONS

Advanced Micro Devices, Inc.: "3DNow Technology Manual" retrieved on Dec. 30, 2009, p. 59-60.

Lin, et al., 39.4: Inverse of Mapping Function (IMF) Method for Image Quality Enhancement of High Dynamic Range LCD TVs, 2007 SID International Symposium, Society for Information Display, Los Angeles, USA, vol. XXXVIII, May 20, 2007, pp. 1343-1345.

Seetzen, et al., "High Dynamic Range Display Systems" proceedings ACM SIGGRAPH; Dec. 9, 2004, pp. 1-9.

Li, et al., "66.1: Distinguished Student Paper: Deriving LED Driving Signal for Area-Adaptive LED Backlight in High Dynamic Range LCD Displays" 2007 SID International Symposium, Society for Information Display, Los Angeles, USA, vol. XXXVIII, May 20, 2007, pp. 1794-1797.

* cited by examiner

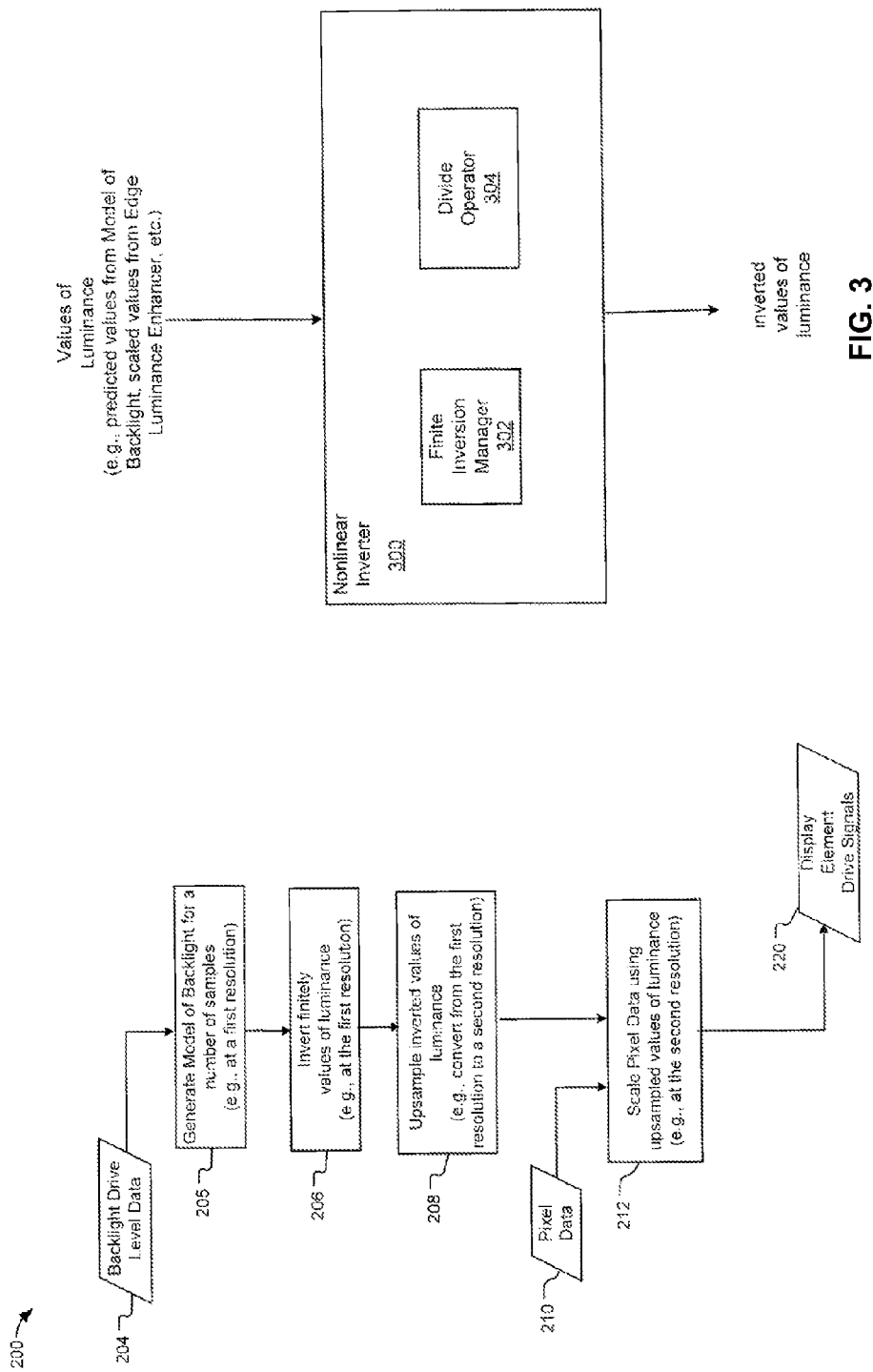

BACKLIGHT SIMULATION AT REDUCED RESOLUTIONS TO DETERMINE SPATIAL MODULATION OF LIGHT FOR HIGH DYNAMIC RANGE IMAGES

CROSS-REFERENCE TO RELATED APPLICATIONS

This application claims priority to U.S. Patent Provisional Application No. 61/105,419, filed 14 Oct. 2008, hereby incorporated by reference in its entirety.

FIELD

Embodiments of the invention relate generally to generating images with an enhanced range of brightness levels, and more particularly, to systems, apparatuses, integrated circuits, computer-readable media, and methods to facilitate high dynamic range imaging by adjusting pixel data and/or using predicted values of luminance, for example, at different resolutions.

BACKGROUND

High dynamic range ("HDR") imaging technology is implemented in projection and display devices to render imagery with a relatively wide range of brightness, where the range usually covers five orders of magnitude between the lowest and the highest luminance levels, with the variance in backlight luminance typically being more than, for example, about 5%, regardless whether the brightness of the display is not relatively high. In some approaches, HDR image rendering devices employ a backlight unit to generate a low-resolution image that illuminates a display that provides variable transmissive structures for the pixels. An example of an HDR image rendering device is a display device that uses light emitting diodes ("LEDs") as backlights and liquid crystal displays ("LCDs") for presenting the image.

While functional, various approaches have drawbacks in their implementation. In some approaches, calculations to generate an HDR image are performed at the pixel level. For example, backlight simulations as well as luminance and image manipulation are performed usually for each pixel. As pixel data for HDR images can require more data bits than, for example, display devices that produce 24-bit RGB color space imagery, some HDR image rendering devices can consume relatively larger amounts of computation resources during the processing of the pixel data for HDR images.

In view of the foregoing, it would be desirable to provide systems, computer-readable media, methods, integrated circuits, and apparatuses to facilitate high dynamic range imaging, among other things.

SUMMARY

Embodiments of the invention relate generally to generating images with an enhanced range of brightness levels, and more particularly, to systems, apparatuses, integrated circuits, computer-readable media, and methods to facilitate high dynamic range imaging by adjusting pixel data and/or using predicted values of luminance, for example, at different resolutions. In at least one embodiment, a method generates an image with an enhanced range of brightness levels. The method can include accessing a model of backlight that includes data representing values of luminance for a number of first samples. The method also can include inverting the values of luminance, as well as upsampling inverted values of luminance to determine upsampled values of luminance. Further, the method can include scaling pixel data for a number of second samples by the upsampled values of luminance to control a modulator to generate an image.

BRIEF DESCRIPTION OF THE FIGURES

The invention and its various embodiments are more fully appreciated in connection with the following detailed description taken in conjunction with the accompanying drawings, in which:

FIG. 2 illustrates a flow diagram representing an example of a method to adjust an image, according to at least some embodiments of the invention.

FIG. 3 is a block diagram of a nonlinear inverter, according to at least some embodiments of the invention.

Like reference numerals refer to corresponding parts throughout the several views of the drawings. Note that most of the reference numerals include one or two left-most digits that generally identify the figure that first introduces that reference number.

DETAILED DESCRIPTION

Figure 1:
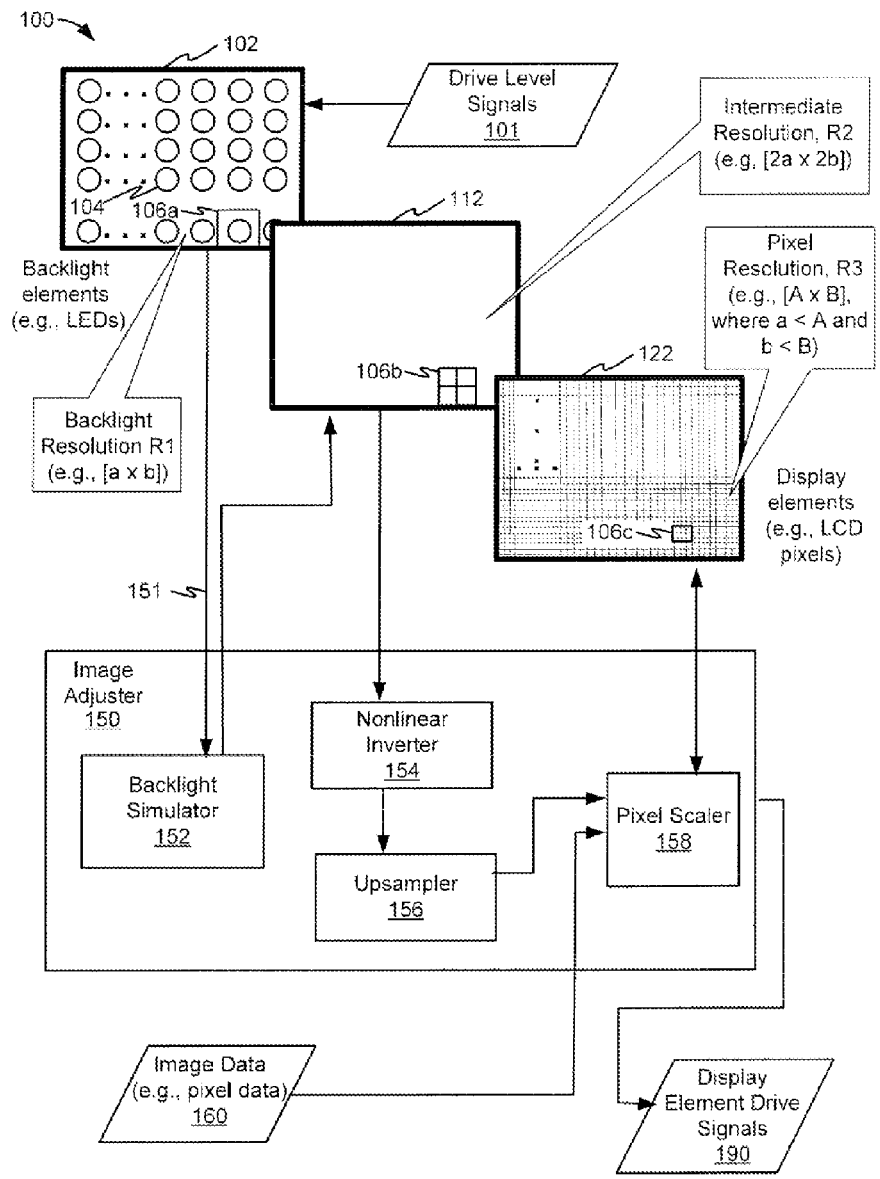
FIG. 1 is a diagram illustrating an example of adjusting an image to enhance a range of brightness levels, according to at least some embodiments of the invention.

FIG. 1 is a diagram illustrating an example of adjusting an image to enhance a range of brightness levels, according to at least some embodiments of the invention. Diagram 100 depicts an image adjuster 150 that can be configured to use predicted values of a pixel characteristic, such as luminance, at a first resolution to adjust the display of an image at a second resolution for a display device. In some cases, the first resolution and the second resolution can correspond respectively to a number of samples and a number of pixels. As used herein, the term "pixel characteristic" can refer to an attribute of a pixel (or sub-pixels), whereby the attribute can be luminance, color, or any other attribute. As shown, image adjuster 150 includes a backlight simulator 152 that is configured to generate and/or maintain a model of backlight at resolutions that are lower than the number of pixels. Image adjuster 150 also includes a nonlinear inverter 154 configured to invert one or more values of the pixel characteristic, an upsampler 156 configured to upsample inverted values of the pixel characteristic to a resolution that substantially matches that of the second resolution (i.e., the number of pixels), and a pixel scaler 158 configured to scale image data 160 to generate display element drive signals 190 that are configured to drive a display device (not shown).

In view of the foregoing, image adjuster 150 and at least some of its constituents, such as backlight simulator 152 and nonlinear inverter 154, can operate upon predicted values of the pixel characteristic, where the number of predicted values are fewer than the number of pixels, according to some embodiments. Thus, image adjuster 150 can perform fewer computations and require less memory than if image adjuster 150 performs as many nonlinear inversion computations as there are pixels. For example, nonlinear inverter 154 can be configured to perform an inversion operation (e.g., a divide operation) on a value of the pixel characteristic for each sample rather than for each pixel. Also, nonlinear inverter 154 can be configured to invert one or more values of the pixel characteristic to yield a finite value for an inverted value of the pixel characteristic. By inverting pixel characteristics in a nonlinear manner, nonlinear inverter 154 can exclude inverting relatively small or negligible values of the pixel characteristic (including zero), thereby reducing or eliminating instances when the result of the inversion process is an infinite value. An infinite value of luminance might otherwise cause a transmissive element (e.g., an LCD pixel) to open up, which, in turn, can cause white level saturation, for example. Further, pixel scaler 158 can be configured to perform multiplication operations to scale image data 160 for each pixel by an upsampled value of the pixel characteristic. As multiplication operations consume less computational resources than inversion operations, pixel scaler 158 can conserve computational resources when generating display element drive signals 190, according to at least some embodiments.

Backlight simulator 152 can be configured to receive drive level signals 101 (or data representing the drive level signals) via path 151 and generate a model of backlight based on the magnitudes of drive level signals 101. To illustrate, consider that arrangement 102 of elements 104 can be associated with an array of data. The data can represent drive level magnitudes (or associated intensities) that can be modeled as being spatially disposed or otherwise associated with a spatial location relative to each other. In some embodiments, arrangement 102 can be a backlight unit configured to modulate, for example, the values of a pixel characteristic (e.g., the values of luminance) associated with elements 104. In some examples, elements 104 can be modeled as light sources, such as LEDs (e.g., RGB, or RGB plus another color, such as yellow or white) or any other light sources, each with a value of luminance being positioned at a location at a corresponding element 104. Examples of a light source include, but are not limited to, a laser light source, a phosphor-based light source, a carbon nanotube-based light source, and other light source. Sample 106a represents a region associated with a light source 104, and is related to region 106b in an intermediate arrangement 112 of data, whereby the number of samples 106a is less than the number of first samples 106b. For example, the intermediate resolution of samples in arrangement 112 can be twice the number (or any multiple number) of samples in arrangement 102. Arrangement 112 and its intermediate resolution include additional samples to, for example, reduce blurring and motion-related effects.

Further, backlight simulator 152 can be configured to predict the values of the pixel characteristic based on the detected drive levels and can generate the model of the backlight, for example, at a greater resolution than that associated with arrangement 102. Backlight simulator 152 then can store one or more values of the predicted pixel characteristic in association with a region, such as region 106b. In some embodiments, backlight simulator 152 can be configured to access the predicted values of pixel characteristics from a data structure, such as arrangement 112, maintained in a repository (not shown). Thus, backlight simulator 152 can operate to access the model of backlight and its data. In some examples, backlight simulator 152 need not generate predicted values of pixel characteristics, and can operate to at least access the model of backlight in a repository, which can include any type of storage mechanism or memory. In some embodiments, backlight simulator 152 can be optional, and, thus, omitted from image adjuster 150. In this case, backlight simulator 152 operates to fetch data representing predicted valued of the pixel characteristic, and need not generate the model of backlight. In at least some embodiments, backlight simulator 152 can be configured to detect drive level data for signals 101 and generate the model of the backlight (and its predicted values of pixel characteristics) in real-time (or near real-time), or in a piecemeal fashion.

According to some embodiments, backlight simulator 152 can be configured to generate a model of backlight that predicts a light field projected onto (or through) a modulator, such as an LCD. Examples of other modulators include, but are not limited to, liquid crystal on silicon ("LCoS") modulating devices, digital micromirror device-based ("DMD") modulators, or other light modulators. In at least one embodiment, backlight simulator 152 can apply a point spread function or a light spread function to a drive level (or an associated intensity) to determine a response to the light spread function, which spatially distributes the predicted value of the pixel characteristic over a region related to a light source 104, such as region 106b in arrangement 112. In particular, the light spread function can be scaled by (e.g., convolved with) each of the values of the magnitudes for the drive levels, followed by a summation of each predicted value of the pixel characteristic. The summation can be performed over multiple regions 106b (not shown) that constitute an area associated with arrangement 112. In some cases, backlight simulator 152 can be configured to filter the magnitudes of the drive level signals 101 to form the model of backlight. An example of such a filter is a Gaussian filter, or any other filter.

Nonlinear inverter 154 can be configured to invert a pixel characteristic, such as the luminance of the model of the backlight. The pixel characteristic can be associated with region 106b to establish an inverted value of the pixel characteristic. In some cases, region 106b can be associated with a group of pixels, such as those in region 106c of arrangement 122. Nonlinear inverter 154 can be further configured to perform a non-linear divide operation to yield a finite value for the inverted value of the pixel characteristic. As a pixel characteristic is associated with each sample represented by region 106b, nonlinear inverter 154 can be configured to perform a number of non-linear divide operations that is equivalent to the number of samples represented by regions 106b.

Upsampler 156 can be configured to upsample the inverted values of the pixel characteristic to a resolution that substantially matches the number of pixels associated with an arrangement 122 of pixels or display elements (or data representations thereof). Arrangement 122 can be an array of data representing pixels, each of which can be spatially disposed or otherwise associated with a spatial location on a display. Arrangement 122 also can be a data structure that can be implemented in a repository. In some examples, the display elements of arrangement 122 can be transmissive elements, such as LCD pixels and the like. Thus, upsampler 156 can be configured to upsample to the full LCD resolution and to smooth the contours of the backlight. In operation, upsampler 156 can be configured to interpolate an inverted value of a pixel characteristic for a sample (associated with region 106*b*) into values of the pixel characteristic for pixels in region 106*c* of arrangement 122. While in some embodiments, upsampler 156 can be configured to implement bilinear interpolation, any other suitable technique can be used to interpolate the inverted values of the pixel characteristic. In some embodiments, upsampler 156 is configured to upsample an inverted value of a pixel characteristic subsequent to nonlinear inverter 154 performing the inversion of the value of the pixel characteristic.

Pixel scaler 158 can be configured to scale image data 160 (e.g., pixel data) for each pixel by the upsampled values of the pixel characteristic to generate display element drive signals 190 that are configured to drive a display device (not shown). In at least one example, pixel scaler 158 can be configured to adjust the inverted values of the pixel characteristic to modify an amount of light transmitting via a modulator (e.g., a front modulator to drive an LCD panel), which is not shown. In some embodiments, pixel scaler 158 can be configured to multiply pixel data (i.e., image data 160) by the upsampled values of the pixel characteristic to form data representing the image to be displayed. In various embodiments, the elements depicted in FIG. 1 can be implemented in software or hardware, or in a combination thereof.

FIG. 2 illustrates a flow diagram representing an example of a method to adjust an image, according to at least some embodiments of the invention. Flow 200 begins with determining backlight drive level data at 204. At 205, a model of backlight is generated to predict values of luminance as a pixel characteristic for a number of samples (e.g., at a first resolution). Flow 200 continues to 206, at which the predicted values of luminance are inverted finitely to generate inverted values of luminance that have finite values, after which the inverted values of luminance are upsampled at 208 to convert the inverted values of luminance from one resolution to another resolution that matches the pixel resolution of, for example, an LCD panel. At 212, upsampled values of luminance from 208 are used to scale the pixel data received at 210 to generate display element drive signals at 220 to, for example, control a modulator that modulates the transmission of light via, for example, an LCD panel.

FIG. 3 is a block diagram of a nonlinear inverter, according to at least some embodiments of the invention. Nonlinear inverter 300 is shown to include a finite inversion manager 302 and a divide operator 304. Finite inversion manager 302 can be configured to manage the inversion of the value of a pixel characteristic, such as luminance, to reduce or eliminate an instance in which divide operator 304 performs a division operation by dividing a numerator with zero or a relatively small value of luminance (e.g., that can be defined as a threshold). Finite inversion manager 302 can receive as an input the predicted values from a model of backlight or from output from an edge luminance enhancer, which is described in FIGS. 5 and 6. Referring back to FIG. 3, finite inversion manager 302 can operate to determine whether a value of luminance is associated with a range of the values of luminance that specifies that divide operator 304 can divide a numerator, such as 1 (for the inversion process), by the value of luminance as the denominator. If so, then divide operator 304 is configured to divide "1" by the value of the pixel characteristic. Otherwise, if, for example, the value of the pixel characteristic is associated a second range, finite inversion manager 302 performs another action to assign a finite value for the inverted value of the pixel characteristic rather than invoking divide operator 304 to perform a divide by 1 operation.

Figure 4:
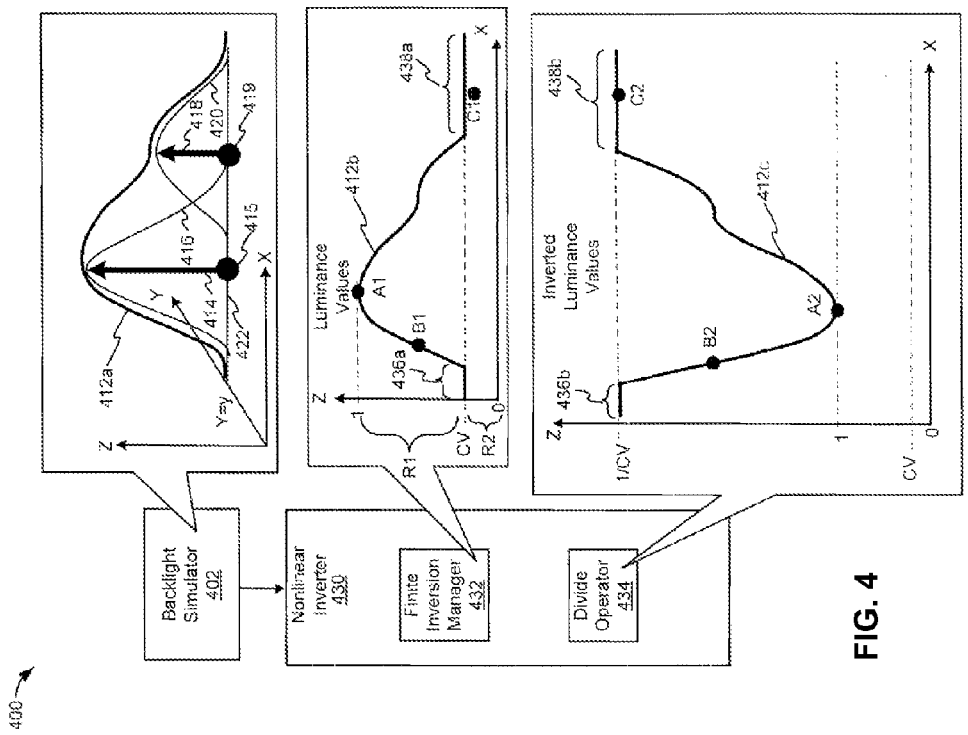
FIG. 4 is a functional block diagram depicting operation of a backlight simulator and a nonlinear inverter, according to at least some embodiments of the invention.

FIG. 4 is a functional block diagram depicting operation of a backlight simulator and a nonlinear inverter, according to at least some embodiments of the invention. Diagram 400 depicts a backlight simulator 402 and nonlinear inverter 430. Backlight simulator 402 is configured to generate a model of backlight, an example of which is shown as backlight luminance 412*a* as a function of spatial positions in the X-Y plane. Nonlinear inverter 430 includes finite inversion manager 432 and divide operator 434, both of which can have equivalent structures and/or functions of similarly-described elements shown in FIG. 3. Divide operator 434 can be configured to divide the values of luminance 412*b* to generate inverted values of luminance 412*c*.

To illustrate the operation backlight simulator 402, consider that a backlight unit and its light sources are disposed in the X-Y plane. Further consider that light sources, such as LEDs, are disposed at spatial positions 415 and 419 at which values of drive levels 414 and 418 (or associated intensities) are disposed respectively. Spatial positions 415 and 419 lie in row 422 at a position "y" from the x-axis. As shown, the magnitude of the value for drive level 414 in the Z direction is greater than the magnitude of the value for drive level 418. Backlight simulator 402 is configured to scale drive levels 414 and 418 (or associated intensities) by a light spread function to individually distribute the values of drive levels 414 and 418 to form respective responses 416 and 420. Next, the responses 416 and 418 can be added to generate predicted values of backlight luminance values as specified by backlight luminance 412*a*. Note that backlight luminance 412*a* represents a slice along "Y=y" of a third dimensional model of backlight luminance (not shown), where backlight luminance 412*a* can be optionally normalized between 0 and 1. Note further that while backlight luminance 412*a* is depicted as a continuous representation, discrete values backlight luminance 412*a*, such as A1 and B2, can be associated with a sample.

Finite inversion manager 432 also can be configured to analyze backlight luminance 412*a* to determine whether the values of backlight luminance 412*a* fall within either within a first range, R1, which spans from value CV ("clamped value") to 1 or within a second range, R2, which spans from 0 to the value of CV. The luminance associated with the clamped value, CV, can be referred to a threshold, below which finite inversion manager 432 operates to clamp the luminance value to value CV. As shown, finite inversion manager 432 indicates to divide operator 434 that values of backlight luminance 412*a* in range R1 are to be used as the denominator in the inversion process. For example, values of luminance A1 and B1 can be used in the denominator when divide operator 434 performs a divide-by-1 operation to establish inverted values of luminance A2 and B2. Note that since A1 is 1, then divide operator 434 performs a "1 divided by 1" operation. Thus, A2 remains with the value of 1. If B1 represents a value of 0.5, then B2 represents an inverted value of 1 (i.e., 1 divided by 0.5), which is 2. Thus, B2 can be 2.

But finite inversion manager 432 can be configured to indicate to divide operator 434 that values of backlight luminance 412*a* in range R2 are to be substituted with or clamped to a clamped value ("CV"). As shown, luminance values in range R2 are clamped to clamped value CV at portions 436*a* and 438*a*. To illustrate, consider that finite inversion manager 432 detects that the value of luminance C1 is within range R2. Next, finite inversion manager 432 can be configured to clamp the value C1 to value CV. When divide operator 434 performs a divide-by-1 operation of CV, the inverted value of luminance C2 is clamped to 1/CV at portions 436*b* and 438*b* of inverted values of luminance 412*c*, rather than some infinite or relatively large number. Note that while FIG. 4 depicts operation of finite inversion manager 432 preceding divide operator 434, the operation of finite inversion manager 432 can be subsequent to that of divide operator 434 in other embodiments.

Figure 5:
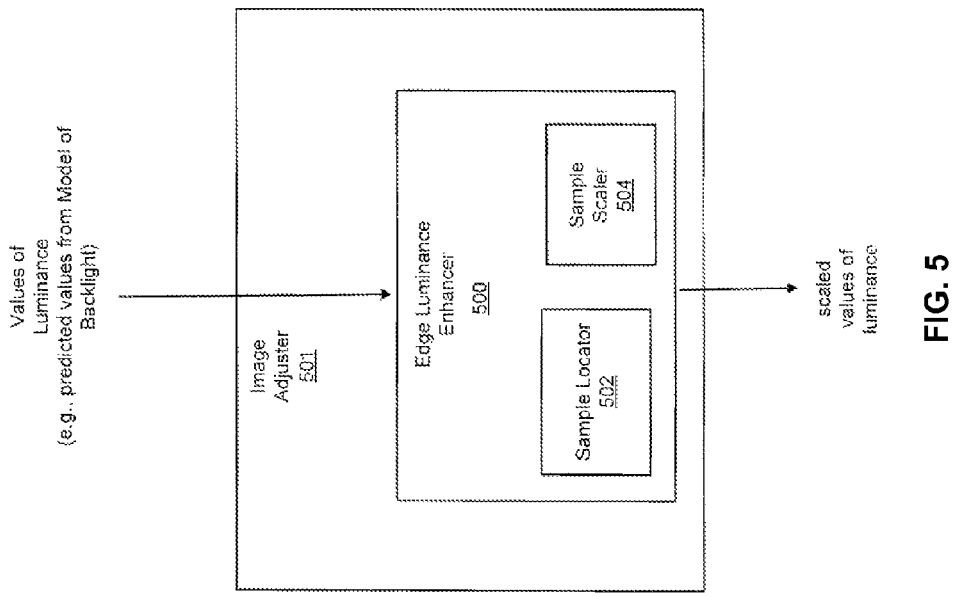
FIG. 5 is a block diagram of an image adjuster that includes an edge luminance enhancer, according to at least some embodiments of the invention.

FIG. 5 is a block diagram of an image adjuster that includes an edge luminance enhancer, according to at least some embodiments of the invention. As shown, image adjuster 501 includes edge luminance enhancer 500, which, in turn, includes sample locator 502 and sample scaler 504. Image adjuster 501 can have an equivalent structure and/or function as the similarly-named elements as described herein. Edge luminance enhancer 500 can be configured to scale a value of the pixel characteristic, such as luminance, as a function of a distance. For example, the distance can extend from a light source associated with the backlight unit to a reference point at which a light source is absent or otherwise has reduced peak luminance capabilities, such as at an edge of a backlight unit or a display device. Therefore, edge luminance enhancer 500 can be configured to modify the predicted value of luminance to compensate for physical losses of light at a distance from a light source or near a region in which peak luminance is reduced.

According to some embodiments, sample locator 502 can be configured to determine the spatial position of a sample relative to a reference point at which light is absent or otherwise has reduced peak luminance capabilities. After the spatial location of the sample is determined, then a profiled value (e.g., L(d)) of the pixel characteristic, such as luminance, can be determined to compensate for the physical losses of light. The profiled value of the pixel characteristic can yield a luminance scaling ("LS") quantity as a function of the distance, d, from a reference point. Sample scaler 504 can be configured to receive information from sample locator 502 about the luminance scaling ("LS") quantity. In operation, sample scaler 504 is configured to increase the value of the pixel characteristic (or luminance) with respect to a peak value of the pixel characteristic (or the peak value of the luminance). In at least some embodiments, sample scaler 504 can be configured to divide the value of the pixel characteristic by the profiled value of the pixel characteristic to, for example, boost the predicted value of the luminance at the edges or in regions with reduced peak luminance.

Figure 6:
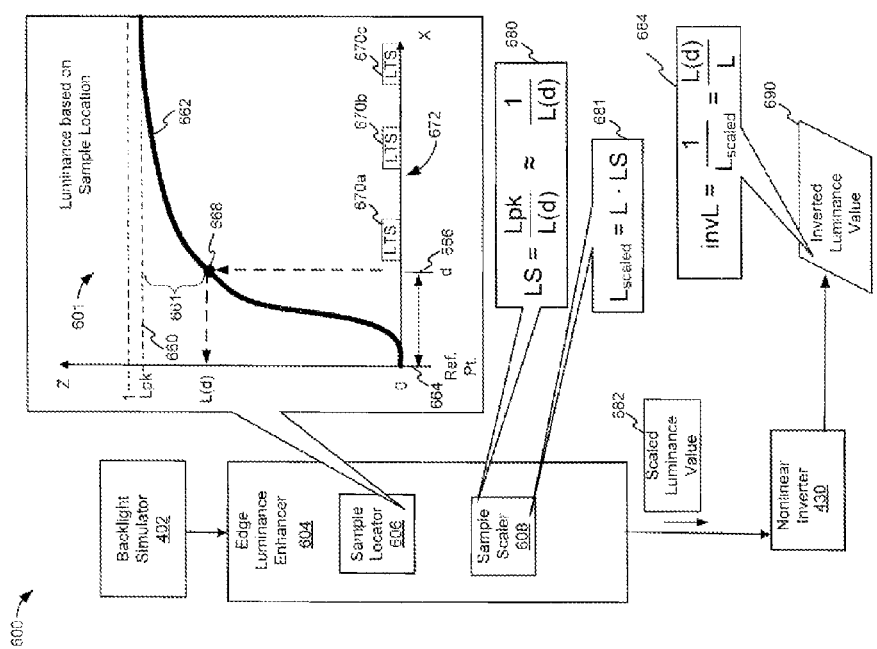
FIG. 6 is a functional block diagram depicting operation of an example of an edge luminance enhancer disposed between a backlight simulator and a nonlinear inverter, according to at least some embodiments of the invention.

FIG. 6 is a functional block diagram depicting operation of an example of an edge luminance enhancer disposed between a backlight simulator and a nonlinear inverter, according to at least some embodiments of the invention. Diagram 600 depicts an edge luminance enhancer 604 disposed between backlight simulator 402 and nonlinear inverter 430, examples of which are discussed in FIG. 4. Edge luminance enhancer 604 includes sample locator 606 and sample scaler 608, which can have similar structures and functions as those described herein.

Sample locator 606 can be configured to determine a profiled value (e.g., L(d)) of luminance as a function of a location of a sample. Diagram portion 601 depicts various light sources ("LTS") 670a to 670c disposed in a backlight unit 672 lying in the X-Y plane. Diagram portion 601 also depicts a profiled value 662 of luminance as a function of the distance, for example, from light sources 670a to 670c. In other embodiments, the distance can be determined from position, d, of a sample to an edge of a display device or to a region or a point with reduced peak luminance. Profiled value 662 of luminance can be modeled based on luminance when light sources 670a to 670c are turned on to a peak luminance ("Lpk") 660 to illuminate the center of the display and most of the back of a front modulator, such as an LCD panel. Further, profiled value 662 of luminance can be modeled to decrease in the Z-direction from peak luminance 660 as the distance increases, for example, from light source 670a to the reference point 664, which can coincide with an edge of a display, or to a region or a point with reduced peak luminance. This decrease can be referred to as edge "roll off" or "drop off." To illustrate the operation of sample locator 606, consider that a sample (e.g., a sample region 106b of FIG. 1) is located adjacent to position ("d") 666. Thus, sample locator 606 can determine distance, d. Sample locator 606 then can determine point 668 on the curved of profiled value 662 of luminance, as well as the value of L(d). Note that at position ("d"), the available profiled luminance at point 688 is reduced by difference 661 from peak luminance ("Lpk") 660.

According to at least some embodiments, sample scaler 608 can be configured to boost the predicted value of luminance that is provided by the modeled backlight luminance from backlight 402. In at least some embodiments, sample scaler 608 can be configured to determine a luminance scaling ("LS") quantity as a function of the distance, d. Relationship 680 depicts that the luminance scaling ("LS") quantity is the inverse of profiled value 662 of luminance (e.g., 1/L(d)), when peak luminance ("Lpk") 660 approximates sufficiently to 1. Further, sample scaler 608 can be configured to scale a predicted value of luminance to determine a scaled luminance ("$L_{scaled}$") value 682 based on the product of a predicted value of luminance ("L") and the luminance scaling ("LS") quantity, as depicted in relationship 681. Further to FIG. 6, scaled luminance ("$L_{scaled}$") value 682 is then passed through a nonlinear inverter operation of nonlinear inverter 430. The output of nonlinear inverter 430 can be an inverted luminance value 690. Further, inverted luminance value ("invL") 690 can be determined by relationship 684, in which the inverse of scaled luminance ("$L_{scaled}$") value 682 can yield (L(d)/L) as a representation of inverted luminance value 690. Note that the above-described functionality of edge luminance enhancer 604 can implement other techniques to calculate inverted luminance value ("invL") 690, and the above discussion is not intended to be limiting.

Figure 7:
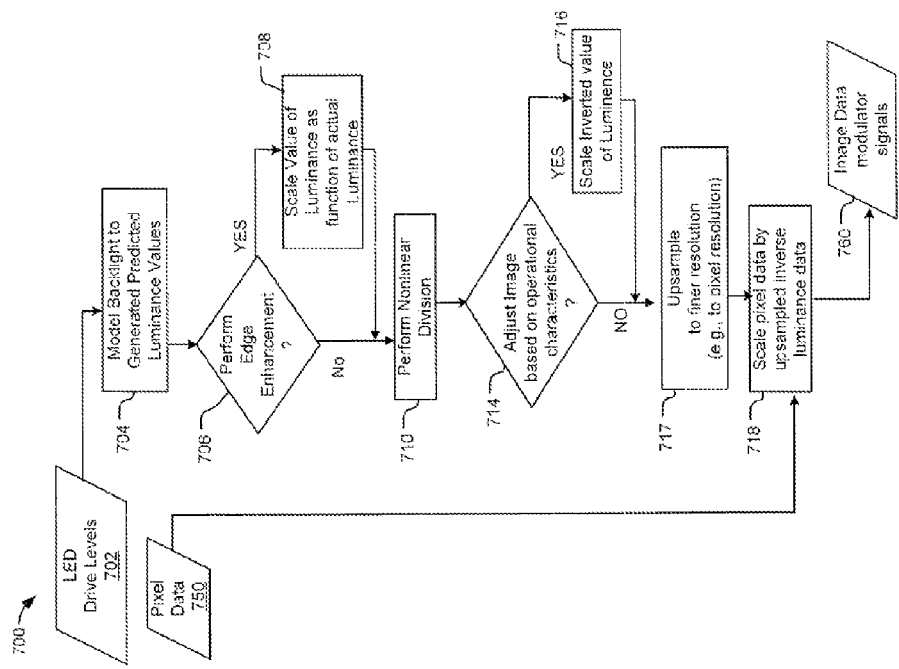
FIG. 7 illustrates a flow diagram representing another example of a method to adjust an image, according to at least some embodiments of the invention.

FIG. 7 illustrates a flow diagram representing another example of a method to adjust an image, according to at least some embodiments of the invention. Flow 700 begins with determining LED backlight drive level data at 702. At 704, a model of backlight is generated to predict values of luminance. Flow 700 continues to 706, at which a determination is made whether to perform edge luminance enhancement. If so, then flow 700 moves to 708 at which the predicted values of luminance can be scaled as a function of the actual available luminance (i.e., L(d), which can be less than peak luminance 660 of FIG. 6) that relates to the profiled value of luminance. If not, flow 700 continues to 710, at which the predicted values (or scaled values) of luminance are inverted finitely to generate inverted values of luminance having finite or bounded values, after which a determination is made whether to adjust an image based on operational characteristics of a display at 714. Such an adjustment can be made to increase the light being output from an LCD. If so, then a scale factor between zero and one is applied to inverted values of luminance output. The scale parameter, c, can be modified based on the operating characteristics of specific LCD panels and backlight units used in displays. As an example, the scale parameter can vary from 0.65 to 1.0. Flow 700 moves to 716 to scale the inverted values of luminance by scale parameter, c. Next, the inverted values of luminance can be upsampled at 717 to a finer resolution, such as the pixel resolution of, for example, an LCD panel. At 718, upsampled values of luminance from 717 can be used to scale pixel data 750 to generate image data modulator signals at 760 to, for example, control a modulator that modulates the transmission of light via, for example, LCD pixels.

Figure 8:
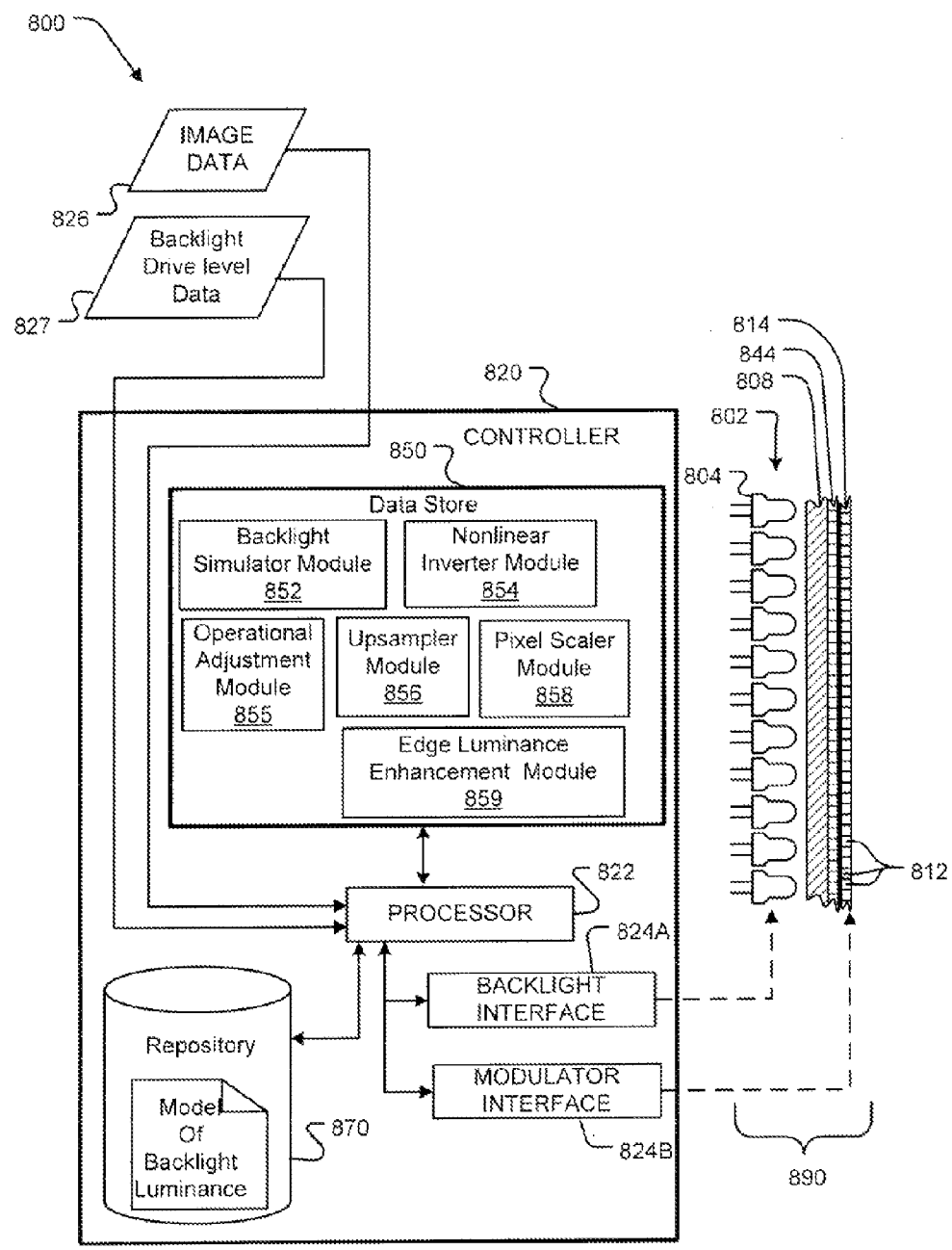
FIG. 8 is a schematic diagram of a controller configured to operate a display device having at least a front modulator, according to at least some embodiments of the invention.

FIG. 8 is a schematic diagram of a controller configured to operate a display device having at least a front modulator, according to at least some embodiments of the invention. System 800 includes a controller 820 configured to be coupled to a display device 890. Controller 820 can include a processor 822, a data store 850, a repository 870, an interface ("backlight interface") 824A configured to control a rear modulator, such as a backlight unit and its light sources, and an interface ("modulator interface") 824B configured to control a front modulator. According to at least some embodiments, controller 820 can be implemented in software, hardware, firmware, circuitry, or a combination thereof. Data store 850 includes one or more of the following modules: a Backlight Simulator 852, a Nonlinear Inverter 854, an Operational Adjustment module 855 configured to implement a functionality as described at 716 in FIG. 7, Upsampler 856, Pixel Scaler 858, and an Edge Luminance Enhancement 859, each of which includes executable instructions for performing the functionalities described herein. Repository 870 can be configured to store data structures including data representing a model of backlight luminance. According to at least some embodiments, controller 820 can be implemented as hardware modules, such as in programmable logic or as part of an ASIC. Further, one or more of the following modules can be implemented as firmware: Backlight Simulator 852, Nonlinear Inverter 854, Operational Adjustment module 855, Upsampler 856, Pixel Scaler 858, and Edge Luminance Enhancement 859. In some embodiments, repository 870 can be implemented in programmable logic.

Display device 890 can include a front modulator 814, a rear modulator 802, and optical structures 844 and 808 being configured to carry light from rear modulator 802 to front modulator 814. Front modulator 814 can be an optical filter of programmable transparency that adjusts the transmissivity of the intensity of light incident upon it from rear modulator 802. Rear modulator 802 can be configured to include one or more light sources. In some examples, rear modulator 802 can be formed from one or more modulating elements 804, such as an array of LEDs. In some examples, front modulator 814 may comprise an LCD panel or other transmission-type light modulator having pixels 812. Front modulator 814 can be associated with a resolution that is higher than the resolution of rear modulator 802. Optical structures 844 and 808 can include elements such as, but not limited to, open space, light diffusers, collimators, and the like. In some examples, front modulator 814 and rear modulator 802 can be configured to collectively operate display device 890 as an HDR display.

Based upon input image 826 and backlight drive level data 827, controller 820 is configured to provide front modulator drive signals to control the modulation of transmissivity associated with LCD pixels 812 of front modulator 814, thereby collectively presenting a desired image on display device 890. Although not shown, controller 820 may be coupled to a suitably programmed computer having software and/or hardware interfaces for controlling rear modulator 802 and front modulator 814 to display an image specified by data corresponding to input image 826. It may be appreciated that any of the elements described in FIG. 8 can be implemented in hardware, software, or a combination of these. In some embodiments, controller 820 can be implemented in projection-based image rendering devices and the like.

Figure 9:
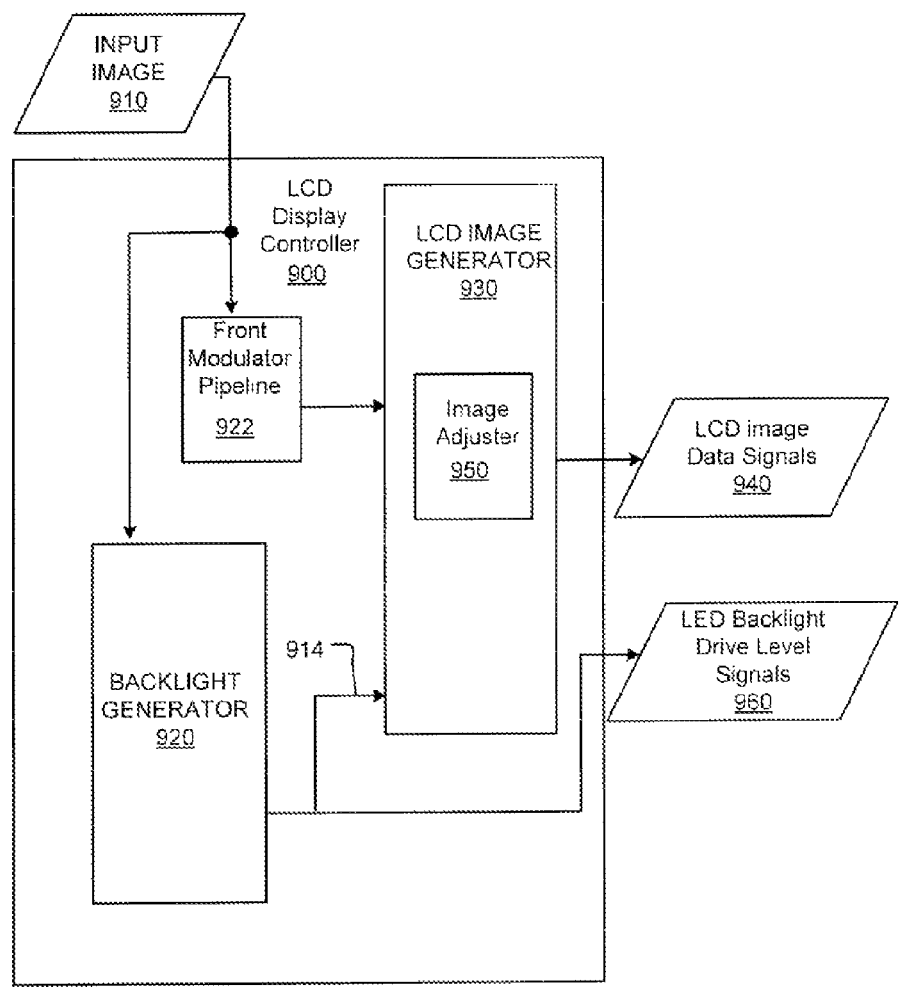
FIG. 9 is a block diagram of an exemplary display controller to operate front and rear modulators.

FIG. 9 is a block diagram of an exemplary display controller to operate front and rear modulators. Here, display controller 900 includes a backlight generator 920, front modulator pipeline 922, and LCD image generator 930. Backlight generator is configured to generate backlight drive level signals 960 to control the operation of a rear modulator. Input image 910 can be provided as gamma-encoded images to backlight generator 920 and to front modulator pipeline 922. LCD image generator 930 can include an image adjuster 950 that can have equivalent structures and/or functionalities as image adjuster 150 of FIG. 1. Thus, LCD image generator 930 can be configured to generate LCD image data signals 940 to control the operation of a front modulator, based upon input from front modulator pipeline 922, and LED backlight drive level signals 960 provided via path 914. Front modulator pipeline 922 can be configured to generate front modulator output values that produce the desired overall light output and white point. For example, pipeline 922 may apply color correction techniques, such as a dividing operation to divide values by a light simulation output (e.g., a model of backlight) to correct, for example, values representing the gamut and front modulator response. In various embodiments, controller 900 can be an LCD display controller implement in hardware as circuit board or an integrated chip, and in software as executable instructions or a combination thereof.

Although in some examples, three levels of resolution have been described as R1<R2<R3, in other examples, it may be appreciated that two levels of resolution can be used such that the resolutions of arrangements 102 and 112 can be the same. In other examples, the resolution of the backlight modulator, R1, can be less than or equal to the resolution, R3, of the front modulator (e.g., R1=R2=R3). Additionally, as used herein in some embodiments, the term first display may be used interchangeably to refer to a front modulator and a display layer. In some examples, the first display may include, but is not limited to an LCD panel, LCD modulator, projection-type display modulators, active matrix LCD ("AMLCD") modulators, and other devices that modulate a light and/or image signal. The term rear modulator, as used herein in some embodiments, can refer to backlight, a backlight unit and modulated light sources, such as LEDs. In some examples, the rear modulator can include, but is not limited to a backlight having an array of controllable LEDs or organic LEDs ("OLEDs"). In other examples, the second display can include a fixed-intensity light source such as a plurality of fluorescent light sources, a low-resolution projector, a light modulator disposed to spatially modulate the intensity of light from the light source, and combination of these.

The above-described methods, techniques, processes, apparatuses and computer-medium products and systems may be implemented in a variety of applications, including, but not limited to, HDR displays, displays of portable computers, digital clocks, watches, appliances, electronic devices, audio-visual devices, medical imaging systems, graphic arts, televisions, projection-type devices, and the like.

In some examples, the methods, techniques and processes described herein may be performed and/or executed by executable instructions on computer processors, for which such methods, techniques and processes may be performed. For example, one or more processors in a computer or other display controller may implement the methods describe herein by executing software instructions in a program memory accessible to a processor. Additionally, the methods, techniques and processes described herein may be implemented using a graphics processing unit ("GPU") or a control computer, or field-programmable gate array ("FPGA") or other integrated circuits coupled to the display. These methods, techniques and processes may also be provided in the form of a program product, which may comprise any medium which carries a set of computer-readable instructions which, when executed by a data processor, cause the data processor to execute such methods, techniques and/or processes. Program products, may include, but are not limited to: physical media such as magnetic data storage media, including floppy diskettes, and hard disk drives; optical data storage media including CD ROMs, and DVDs; electronic data storage media, including ROMs, flash RAM, non-volatile memories, thumb-drives, or the like; and transmission-type media, such as digital or analog communication links, virtual memory, hosted storage over a network or global computer network, and networked-servers.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, Ruby on Rails, and others. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. These can be varied and are not limited to the examples or descriptions provided.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The various examples of the invention may be implemented in numerous ways, including as a system, a process, an apparatus, or a series of program instructions on a computer readable medium such as a computer readable storage medium or a computer network where the program instructions are sent over optical or electronic communication links.

In general, the flows of disclosed processes may be performed in an arbitrary order, unless otherwise provided in the claims.

Various embodiments of the present invention may relate to one or more of the Enumerated Example Embodiments (EEEs) below, each of which are examples, and, as with any other related discussion provided above, should not be construed as limiting any claim or claims provided yet further below as they stand now or as later amended, replaced, or added. Likewise, these examples should not be considered as limiting with respect to any claim or claims of any related patents and/or patent applications (including any foreign or international counterpart applications and/or patents, divisionals, continuations, re-issues, etc.). Examples:

Enumerated Example Embodiment (EEE) 1. A method of generating an image, the method comprising:

inverting values of a pixel characteristic to establish inverted values of the pixel characteristic for a number of first samples;

upsampling the inverted values of the pixel characteristic to determine upsampled values of the pixel characteristic; and scaling pixel data for a number of second samples by the upsampled values of the pixel characteristic to control a modulator to generate an image, wherein the number of first samples is fewer than the number of second samples.

EEE2. The method of claim 1 wherein inverting the values of the pixel characteristic comprises:

inverting predicted values of the pixel characteristic, wherein the predicted values of the pixel characteristic are associated with a model of backlight.

EEE3. The method of claim 1 wherein the pixel characteristic comprises:

luminance.

EEE4. The method of claim 1 wherein upsampling the inverted values of the pixel characteristic further comprises:

upsampling the inverted values of the pixel characteristic subsequent to inverting the values of the pixel characteristic.

EEE5. The method of claim 1 wherein upsampling the inverted values of the pixel characteristic further comprises:

interpolating the inverted values of the pixel characteristic for the number of first samples to form the upsampled values of the pixel characteristic for the second number of samples.

EEE6. The method of claim 1 further comprising:

scaling a value of the pixel characteristic as a function of the distance from a light source associated with the backlight to a reference point at which a light source is absent.

EEE7. The method of claim 6 wherein scaling the value of the pixel characteristic comprises:

increasing the value of the pixel characteristic with respect to a peak value of the pixel characteristic.

EEE8. The method of claim 6 wherein scaling the value of the pixel characteristic comprises:

dividing the value of the pixel characteristic by a profiled value of the pixel characteristic.

EEE9. The method of claim 1 wherein inverting the values of the pixel characteristic comprises:

inverting each of the values of the pixel characteristic that is associated with a group of pixels to establish an inverted value of the pixel characteristic.

EEE10. The method of claim 9 wherein inverting each of the values of the pixel characteristic comprises:

performing a non-linear divide operation to yield a finite value for the inverted value of the pixel characteristic.

EEE11. The method of claim 9 wherein inverting each of the values of the pixel characteristic comprises:
determining whether a value of the pixel characteristic is associated with a range for the values of the pixel characteristic;
dividing 1 by the value of the pixel characteristic if the value of the pixel characteristic is associated the first range to establish the inverted value of the pixel characteristic; and
assigning a finite value for the inverted value of the pixel characteristic if the value of the pixel characteristic is associated a second range.

EEE12. The method of claim 1 wherein inverting the values of the pixel characteristic comprises:
performing a number of non-linear divide operations to yield finite values for the inverted values of the pixel characteristic,
wherein the number of non-linear divide operations is substantially equivalent to the number of first samples.

EEE13. The method of claim 1 further comprises:
adjusting the inverted values of the pixel characteristic to modify an amount of light transmitted via the modulator.

EEE15. The method of claim 13 adjusting the inverted values of the pixel characteristic comprises:
determining a scaling factor based on an operational characteristic of a light source configured to project light onto the modulator; and
scaling the inverted values of the pixel characteristic by the scaling factor.

EEE16. The method of claim 1 wherein scaling pixel data comprises:
multiplying the pixel data by the ups ampled values of the pixel characteristic.

EEE17. The method of claim 1 wherein accessing the model of backlight comprises:
detecting drive levels configured to modulate light sources to form detected drive levels; and
predicting the values of the pixel characteristic based on the detected drive levels for the first samples to establish predicted values as the values of the pixel characteristic to generate the model of the backlight,
wherein a number of the light sources is less than the number of first samples.

EEE18. The method of claim 16 wherein predicting the values of the pixel characteristic comprises:
filtering magnitudes of the detected drive levels to form the predicted values of the pixel characteristic for groups of pixels associated with the light sources.

EEE19. The method of claim 17 wherein filtering the magnitudes of the detected drive levels comprises:
applying a point spread function to the magnitudes of the detected drive levels to form the predicted values of the pixel characteristic.

EEE20. An apparatus comprising:
a repository comprising:
a data structure configured to arrange data representing predicted values of luminance for a number of samples that is greater in quantity than a number of light sources;
a memory comprising:
an inverter module, an upsampler module, and a pixel scaler module; and
a processor configure to:
access the data structure to fetch the data representing the predicted values of luminance,
invert the predicted values of luminance, responsive to executable instructions in the inverter module, to establish a quantity of inverted values of luminance that is substantially equivalent to the number of samples,
upsample the inverted values of luminance, responsive to executable instructions in the upsampler module, to generate a quantity of upsampled values of luminance that is substantially equivalent to a number of pixels, and
scale pixel data by the upsampled values of luminance, responsive to executable instructions in the pixel scaler module, to form a modulation signal to control a front modulator to generate an image.

EEE21. The apparatus of claim 19 wherein the inverter module comprises:
a nonlinear inverter module, the processor being further configured to generate finite values of the inverted values of luminance responsive to executable instructions in the nonlinear inverter module.

EEE22. The apparatus of claim 19 further comprising:
an edge luminance enhancement module, the processor being further configured to generate an edge-enhanced value for one of the inverted values of luminance, responsive to executable instructions in the edge luminance enhancement module that determine a sample associated with the edge-enhanced value is located at a distance from a reference point,
wherein the reference point substantially coincides with an edge of a display device.

EEE23. The apparatus of claim 19 further comprising:
a display layer including liquid crystal display ("LCD") panel; and
a modulator interface configured to modify transmissitivity of the LCD panel, responsive to the modulation signal.

EEE24. A computer readable medium comprising executable instructions configured to:
modify a subset of predicted values of luminance for a subset of light sources to form modified values of luminance, the subset of the light sources being associated with a range of distances from a reference point;
invert the modified values of luminance and other predicted values of luminance to establish a quantity of inverted values of luminance; and
scale pixel data for each of the number of pixels by the inverted values of luminance to control a liquid crystal display ("LCD") to generate an image,
wherein the quantity of the inverted values of luminance is fewer than the number of pixels.

EEE25. The computer readable medium of claim 23 further comprises executable instructions configured to:
access data representing the predicted values of luminance for a number of samples, the predicted values of luminance being based on drive levels for driving the light sources.

EEE26. The computer readable medium of claim 23 further comprises executable instructions configured to:
perform bilateral interpolation on the inverted values of luminance to form a quantity of interpolated values of luminance for the number of pixels.

EEE27. The computer readable medium of claim 25 wherein the executable instructions configured to scale the pixel data further comprise executable instructions configured to:
scale the pixel data by the interpolated values of luminance.

EEE28. The computer readable medium of claim 25 wherein the executable instructions configured to perform bilateral interpolation comprise executable instructions configured to:
interpolate the inverted values of luminance subsequent to the execution of instructions configured to invert the modified values of luminance and the other predicted to values of luminance.

EEE29. The computer readable medium of claim 23 wherein the executable instructions configured to modify predicted values of luminance further comprises executable instructions configured to:

scale a value of luminance as a function of the distance from one of the light sources to a reference point at which another light source is absent.

EEE30. The computer readable medium of claim 28 wherein the reference point comprises:

an edge of a display device.

EEE31. The computer readable medium of claim 28 wherein the executable instructions configured to scale the value of luminance comprise executable instructions configured to:

divide the value of luminance by a profiled value of luminance to form a modified predicted value of luminance.

EEE32. The computer readable medium of claim 23 wherein the executable instructions configured to invert the modified values of luminance and the other predicted values of luminance comprise executable instructions configured to:

invert one value from either the modified values of luminance or the other predicted values of luminance to establish an inverted value of luminance.

EEE33. The computer readable medium of claim 31 wherein the executable instructions configured to invert the one value comprise executable instructions configured to:

perform a non-linear divide operation to yield a finite value for the inverted value of luminance.

EEE34. computer readable medium of claim 31 wherein the executable instructions configured to invert the one value comprise executable instructions configured to:

determine whether a value of luminance is associated with a range of the values of luminance;

divide 1 by the value of luminance if the value of luminance is associated a first range to establish the inverted value of luminance; and assign a finite value for the inverted value of luminance if the value of luminance is associated a second range.

EEE35. A controller comprising:

an inverter configured to invert values of a pixel characteristic to establish inverted values of the pixel characteristic, the values of the pixel characteristic being predicted values of the pixel characteristic that constitute a model of backlight for a number of first samples;

an upsampler configured to upsample the inverted values of the pixel characteristic to determine upsampled values of the pixel characteristic; and a pixel scaler configured to scale pixel data for a number of second samples by the upsampled values of the pixel characteristic to control a modulator to generate an image, wherein the number of second samples is greater than the number of first samples.

EEE36. The controller of claim 34 wherein the inverter comprises:

a non-linear inverter configured to perform a non-linear divide operation to yield a finite value for the inverted value of the pixel characteristic.

EEE37. The controller of claim 35 wherein the non-linear inverter further comprises:

a finite inversion manager configured to:

determine whether a value of the pixel characteristic is associated with a first range or a second range of the values of the pixel characteristic, and assign a finite value for the inverted value of the pixel characteristic if the value of the pixel characteristic is associated the second range; and a divide operator configured to:

divide 1 by the value of the pixel characteristic if the value of the pixel characteristic is associated the first range to establish the inverted value of the pixel characteristic.

EEE38. The controller of claim 34 further comprising:

an edge luminance enhancer configured to scale a value of the pixel characteristic as a function of a distance from a light source to a reference point.

EEE39. The controller of claim 35 wherein the reference point comprises:

an edge of a display device.

EEE40. The controller of claim 35 wherein the edge luminance enhancer comprises:

a sample locator configured to:

determine a profiled value of the pixel characteristic as a function of the distance; and a sample scaler configured to:

divide the value of the pixel characteristic by the profiled value to form a modified predicted value of the pixel characteristic.

EEE41. The controller of claim 34 wherein the upsampler is configured to:

perform bilateral interpolation on the inverted values of the pixel characteristic to form interpolated values of the pixel characteristic.

EEE42. The controller of claim 38 wherein the pixel scaler is configured to:

multiply the pixel data by the interpolated values of the pixel characteristic.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

What is claimed:

1. An apparatus comprising:

a repository comprising:

a data structure configured to arrange data representing predicted values of luminance for a number of samples that is greater in quantity than a number of light sources;

a memory comprising:

an inverter module, an upsampler module, and a pixel scaler module; and a processor configured to:

access the data structure to fetch the data representing the predicted values of luminance, invert the predicted values of luminance, responsive to executable instructions in the inverter module, to establish a quantity of inverted values of luminance that is substantially equivalent to the number of samples, upsample the inverted values of luminance, responsive to executable instructions in the upsampler module, to generate a quantity of upsampled inverted values of luminance that is substantially equivalent to a number of pixels, and scale pixel data by the up sampled inverted values of luminance, responsive to executable instructions in the pixel scaler module, to form a modulation signal to control a front modulator to generate an image.

2. The apparatus according to claim 1, wherein the predicted values of luminance are associated with a model of backlight.

3. The apparatus according to claim 1, scaling a value of the pixel characteristic as wherein the scaled pixel data comprises scaling via a function of distance from a location of a sample to a reference point at an edge of the display or a region or point with reduced peak luminance.

4. The apparatus according to claim 1 wherein the inverted values of luminance comprise one of:
an inversion of each of values of pixel characteristics associated with a group of pixels to establish an inverted value of the pixel characteristic; and
a division of values of pixel characteristics modified so that its result is clamped to a finite value for the inverted values.

5. The apparatus according to claim 1 wherein the predicted values of luminance are inverted by
divide operations that are modified so that their results are clamped to finite values for the inverted values of the pixel characteristic,
wherein the number of divide operations is substantially equivalent to the number of first samples.

6. The apparatus according to claim 1 wherein the inverted values of luminance are adjusted to modify an amount of light transmitted via the modulator, comprising determining a scaling factor based on an operational characteristic of a light source configured to project light onto the modulator, and scaling the inverted values of the pixel characteristic by the scaling factor.

7. The apparatus of claim 1 further comprising:
an edge luminance enhancement module, the processor being further configured to generate an edge-enhanced value for one of the inverted values of luminance, responsive to executable instructions in the edge luminance enhancement module that scale a value of luminance as a function of the distance from a location of the sample associated with the value of luminance from a reference point,
wherein the reference point substantially coincides with an edge of a display device.

8. A controller, comprising:
an inverter configured to invert values of a pixel characteristic to establish inverted values of the pixel characteristic, the values of the pixel characteristic being predicted values of the pixel characteristic that constitute a model of backlight for a number of first samples;
an upsampler configured to upsample the inverted values of the pixel characteristic to determine upsampled inverted values of the pixel characteristic; and
a pixel scaler configured to scale pixel data for a number of second samples by the upsampled inverted values of the pixel characteristic to control a modulator to generate an image, and
an edge luminance enhancer configured to scale a value of the pixel characteristic as a function of a distance from a location of a first sample associated with the value of the pixel characteristic to a reference point comprising an edge of a display device
wherein the number of second samples is greater than the number of first samples
and wherein the edge luminance enhancer comprises,
a sample locator configured to determine a profiled value of the pixel characteristic as a function of the distance, and
a sample scaler configured to divide the value of the pixel characteristic by the profiled value to form a modified predicted value of the pixel characteristic.

9. The controller of claim 8 wherein the upsampler is configured to:
perform bilateral interpolation on the inverted values of the pixel characteristic to form interpolated inverted values of the pixel characteristic.

* * * * *